US012662287B2

(12) United States Patent
Kudo

(10) Patent No.: US 12,662,287 B2
(45) Date of Patent: Jun. 23, 2026

(54) LIQUID REPLENISHMENT CONTAINER

(71) Applicant: SEIKO EPSON CORPORATION, Tokyo (JP)

(72) Inventor: Koji Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 186 days.

(21) Appl. No.: 18/531,040

(22) Filed: Dec. 6, 2023

(65) Prior Publication Data

US 2024/0190608 A1 Jun. 13, 2024

(30) Foreign Application Priority Data

Dec. 7, 2022 (JP) ................................ 2022-195518

(51) Int. Cl.

| | |
|---|---|
| ***B65D 8/00*** | (2006.01) |
| ***B41J 2/175*** | (2006.01) |
| ***B65D 25/54*** | (2006.01) |
| ***B65D 47/12*** | (2006.01) |
| ***B65D 47/20*** | (2006.01) |

(52) U.S. Cl.

CPC .......... *B65D 15/02* (2013.01); *B41J 2/17506* (2013.01); *B65D 15/24* (2013.01); *B65D 25/54* (2013.01); *B65D 47/123* (2013.01); *B65D 47/20* (2013.01)

(58) Field of Classification Search

CPC ........ B65D 15/02; B65D 15/24; B65D 25/54; B65D 47/123; B65D 47/20; B41J 2/17506; B41J 2/175; B41J 2/17509; B41J 2/17513; B41J 2/1754; B41J 2/17553; B41J 29/13

See application file for complete search history.

(56) References Cited

U.S. PATENT DOCUMENTS

| | | | | |
|---|---|---|---|---|
| 1,147,033 A * | 7/1915 | Maloney | B65D 25/54 | 217/58 |
| 5,356,046 A * | 10/1994 | Burke | B67D 3/00 | 383/106 |
| 10,618,292 B2 * | 4/2020 | Fukasawa | B41J 2/17523 | |
| 2022/0267059 A1 | 8/2022 | Nagaoka et al. | | |

FOREIGN PATENT DOCUMENTS

| | | |
|---|---|---|
| EP | 4 049 844 A1 | 8/2022 |
| JP | 2022-129862 A | 9/2022 |

* cited by examiner

*Primary Examiner* — Donnell A Long
(74) *Attorney, Agent, or Firm* — Oliff PLC

(57) ABSTRACT

A liquid replenishment container includes a liquid accommodation section configured to accommodate a liquid, a pouring section coupled to the liquid accommodation section and having an outlet port for pouring the liquid, and a cap section mounted on the pouring section and covering the outlet port, in which the liquid accommodation section includes a main section formed of metal, and at least one of the liquid accommodation section and the pouring section includes a viewing section formed of a transparent or translucent member.

8 Claims, 7 Drawing Sheets

LIQUID REPLENISHMENT CONTAINER

The present application is based on, and claims priority from JP Application Serial Number 2022-195518, filed Dec. 7, 2022, the disclosure of which is hereby incorporated by reference herein in its entirety.

BACKGROUND

1. Technical Field

The present disclosure relates to a liquid replenishment container.

2. Related Art

In the related art, an ink jet printer that can perform printing with ink on a print medium by ejecting the ink from a print head toward the print medium such as print paper is known as an example of an ink jet apparatus. Such an ink jet printer is an ink replenishment type printer that is used by replenishing ink in an ink tank. JP-A-2022-129862 discloses a liquid replenishment container of this type which is a container suitable for reuse and of which liquid accommodation section is formed of metal.

However, like a liquid replenishment container in JP-A-2022-129862, a liquid accommodation section formed of metal is suitable for reuse, but has a problem in terms of convenience because an amount of liquid, a color of the liquid, and the like cannot be seen through a metal wall. It is desirable to provide a liquid replenishment container suitable for reuse and with better convenience.

SUMMARY

The present disclosure can be realized in the following aspects.

According to a first aspect of the present disclosure, there is provided a liquid replenishment container. The liquid replenishment container is a liquid replenishment container for replenishing a liquid jet apparatus with a liquid and includes a liquid accommodation section configured to accommodate the liquid, a pouring section coupled to the liquid accommodation section and having an outlet port for pouring the liquid, and a cap section mounted on the pouring section and covering the outlet port, in which the liquid accommodation section has a main section formed of metal, and at least one of the liquid accommodation section and the pouring section has viewing section formed of one of a transparent or translucent member.

DESCRIPTION OF EMBODIMENTS

A. First Embodiment

A1. Configuration of Printer 100

Figure 1:
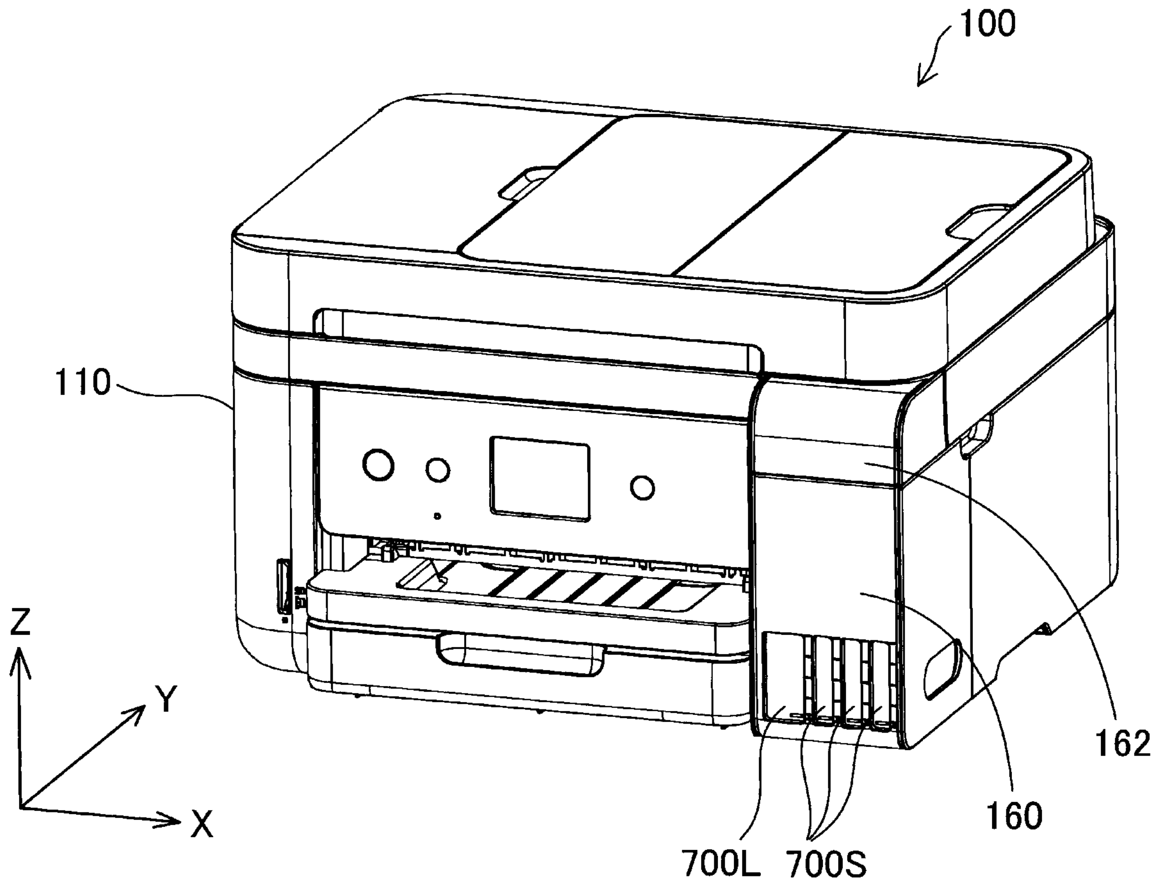
FIG. 1 is a perspective view of a printer according to a first embodiment.

FIG. 1 is a perspective view of a printer 100 according to a first embodiment. The printer 100 is an ink jet printer that ejects ink onto a print medium for printing. The printer 100 corresponds to a "liquid jet apparatus". In FIG. 1, XYZ axes orthogonal to each other are illustrated. The X axis corresponds to a width direction of the printer 100, the Y axis corresponds to a depth direction of the printer 100, and the Z axis corresponds to a height direction of the printer 100. The printer 100 is installed on a horizontal installation surface defined by an X direction and a Y direction. An "X-axis direction" means a concept in which a +X direction and a −X direction are combined. Likewise, a "Y-axis direction" means a concept in which a +Y direction and a −Y direction are combined, and a "Z-axis direction" means a concept in which a +Z direction and a −Z direction are combined.

The printer 100 includes a housing 110. A carriage (not illustrated) that can move in a main scan direction (the X-axis direction) is provided inside the housing 110. A print head that ejects ink onto a print medium is installed in the carriage. An ink tank accommodation unit 160 that accommodates a plurality of ink tanks 700S and 700L is provided at one end of a front surface of the housing 110. The ink tank accommodation unit 160 includes a lid 162 that can be opened and closed at a top portion of the ink tank accommodation unit 160. The ink tank 700S is a small-capacity tank, and the ink tank 700L is a large-capacity tank. Meanwhile, in the following description, both the ink tanks are simply referred to as an "ink tank 700" without distinction.

Each ink tank 700 is coupled to a print head of the carriage by a tube (not illustrated). That is, the ink tank 700 is a stationary ink tank that is not mounted on the carriage of the printer 100. Also, each ink tank 700 is an ink replenishment type ink tank to which ink is replenished from a liquid replenishment container when the remaining amount of ink is low. In the present embodiment, the ink tank 700 is a stationary ink tank, and may be mounted on the carriage of the printer 100.

Figure 2:
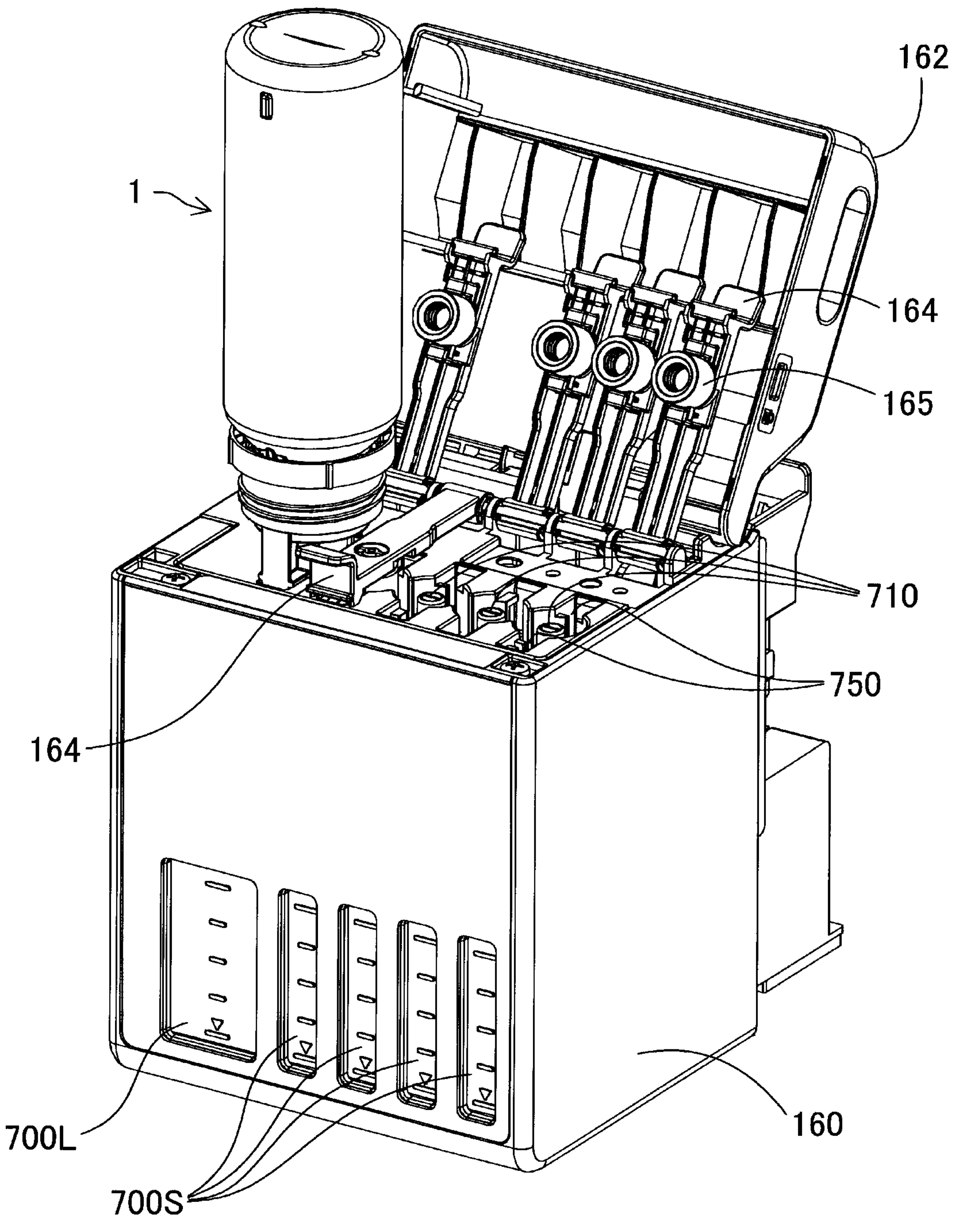
FIG. 2 is a perspective view illustrating a state where ink is replenished to an ink tank by using a liquid replenishment container.

FIG. 2 is a perspective view illustrating a state where ink is replenished to the ink tank 700 by using a liquid replenishment container 1. A front surface of each ink tank 700 is formed of a transparent member, and the remaining amount of ink in each ink tank 700 can be viewed from an outside. When the remaining amount of ink is reduced, as illustrated in FIG. 2, the lid 162 is opened and ink can be replenished from an ink inlet flow path member 710 of the ink tank 700.

The ink inlet flow path member 710 of a tubular shape for replenishing ink to the ink tank 700 is provided on an upper surface of each ink tank 700. The ink tank accommodation unit 160 includes a sealing cap member 164 including a sealing cap 165 for sealing a front end of the ink inlet flow path member 710. In a state where ink is not replenished into the ink tank 700, the front end of the ink inlet flow path member 710 is sealed by the sealing cap 165 of the sealing cap member 164. When ink is replenished into the ink tank 700, the sealing cap member 164 is separated from the ink inlet flow path member 710, and a front end portion of the liquid replenishment container 1 is inserted at a position of the ink inlet flow path member 710, and thereby, the ink is replenished.

In the present specification, a term "ink replenishment" means an operation of supplying ink to the ink tank 700 to increase the remaining amount of ink. Meanwhile, the ink tank 700 is not required to be filled up with ink according to the "ink replenishment". Also, the "ink replenishment" also includes an operation of filling the empty ink tank 700 with ink when the printer 100 is used for the first time.

A2. Configuration of Liquid Replenishment Container 1

Figure 3:
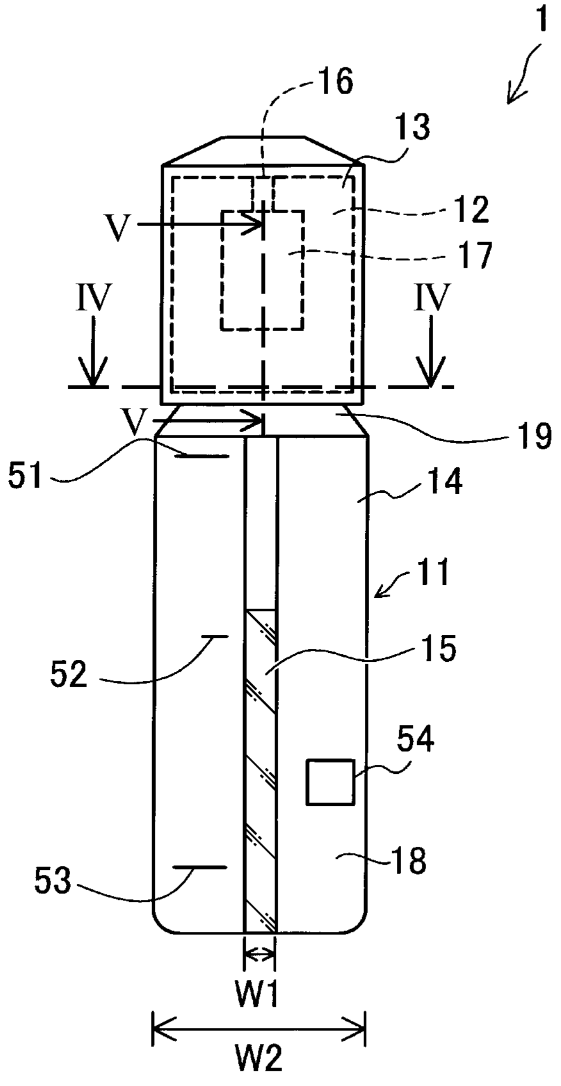
FIG. 3 is a front view illustrating an appearance of the liquid replenishment container according to the first embodiment.

FIG. 3 is a front view illustrating an appearance of the liquid replenishment container 1 according to a first embodiment. As illustrated in FIG. 3, the liquid replenishment container 1 includes a liquid accommodation section 11 capable of accommodating ink inside, a pouring section 12 coupled to the liquid accommodation section 11, and a cap section 13 mounted on the pouring section 12, and has a cylindrical bottle shape as a whole. Hereinafter, in describing the liquid replenishment container 1, description is given by defining that a vertical direction in a state where the liquid replenishment container 1 stands alone on a horizontal plane is a height direction, and top and bottom illustrated in FIG. 3 are "top and bottom". In the liquid replenishment container 1, the pouring section 12 and the cap section 13 are located at an upper side of the liquid accommodation section 11.

The pouring section 12 has an outlet port 16 that is an outlet when liquid accommodated in the liquid accommodation section 11 is poured, and is a portion from which ink is poured. A valve structure 17, such as a slit valve or a spring valve, is disposed inside the pouring section 12. The valve structure 17 is configured to seal the outlet port 16 to prevent ink from leaking to the outside in a non-replenishment state where ink is not replenished to the ink tank 700 and is configured to release the sealing to allow the ink to flow into the ink inlet flow path member 710 in a replenishment state where ink is replenished to the ink tank 700. The pouring section 12 is formed of resin.

The cap section 13 is mounted on the pouring section 12, covers the pouring section 12, and shields the inside of the liquid accommodation section 11 from external air. The cap section 13 can be attached to and detached from the pouring section 12 by screw engagement (not illustrated).

The liquid accommodation section 11 is a cylindrical member having a lower end, which is a bottom, in a longitudinal direction and an upper end where an opening is formed. The liquid accommodation section 11 occupies a length of approximately ½ or more and ⅔ or less in the longitudinal direction (same as the height direction described above) of the liquid replenishment container 1, and serves as a main body portion of the liquid replenishment container 1. The liquid accommodation section 11 includes a main section 14 and a viewing section 15. The main section 14 is formed of metal and occupies most of the liquid accommodation section 11. The viewing section 15 is formed of glass and is transparent or translucent.

The viewing section 15 is continuously formed from a substantially upper end to a bottom surface of a portion not covered by the cap section 13 in a height direction of a side surface of the liquid accommodation section 11 in a part of the liquid accommodation section 11 in a circumferential direction. A width W1 of the viewing section 15 in the circumferential direction is approximately ⅕ of a width W2 of entirety of the liquid replenishment container 1 in a front view illustrated in FIG. 3. When viewing the viewing section 15 from the side surface of the liquid accommodation section 11, a user can check the remaining amount of ink in the liquid accommodation section 11 from the outside. FIG. 3 illustrates an example in which ink is contained up to half or more in the height direction of the liquid accommodation section 11.

Scales 51, 52, and 53 are displayed on a part on one side (the left side in FIG. 3) of the viewing section 15 in the main section 14. A QR code (registered trademark) 54 is displayed on a part near a bottom surface on the other side (the right side in FIG. 3) of the viewing section 15 in the main section 14. Information such as a color and a model number of ink is registered in the QR code 54. The scales 51, 52, and 53 and the QR code 54 are directly printed on the liquid accommodation section 11. The scales 51, 52, and 53 and the QR code 54 correspond to an example of "information on a liquid replenishment container".

The main section 14 and the viewing section 15 are bonded to each other and integrally molded. Bonding between the main section 14 formed of metal and the viewing section 15 formed of glass can be performed by bonding, for example, coval metal and coval glass which match each other in thermal expansion coefficient. This bonding example is an example, and other bonding methods are also included in the bonding example. For example, a bonding form, in which the viewing section 15 is fitted to an opening provided in the main section 14 through a sealing member such as packing, may be used. Also, adhesion using an adhesive may be used. The main section 14 may be formed of metal, and the viewing section 15 may be formed of a transparent or translucent material that enables the inside of a container to be viewed, and the main section 14 and the viewing section 15 may be bonded to each other. A material of the viewing section 15 may be resin in addition to glass.

Figure 4:
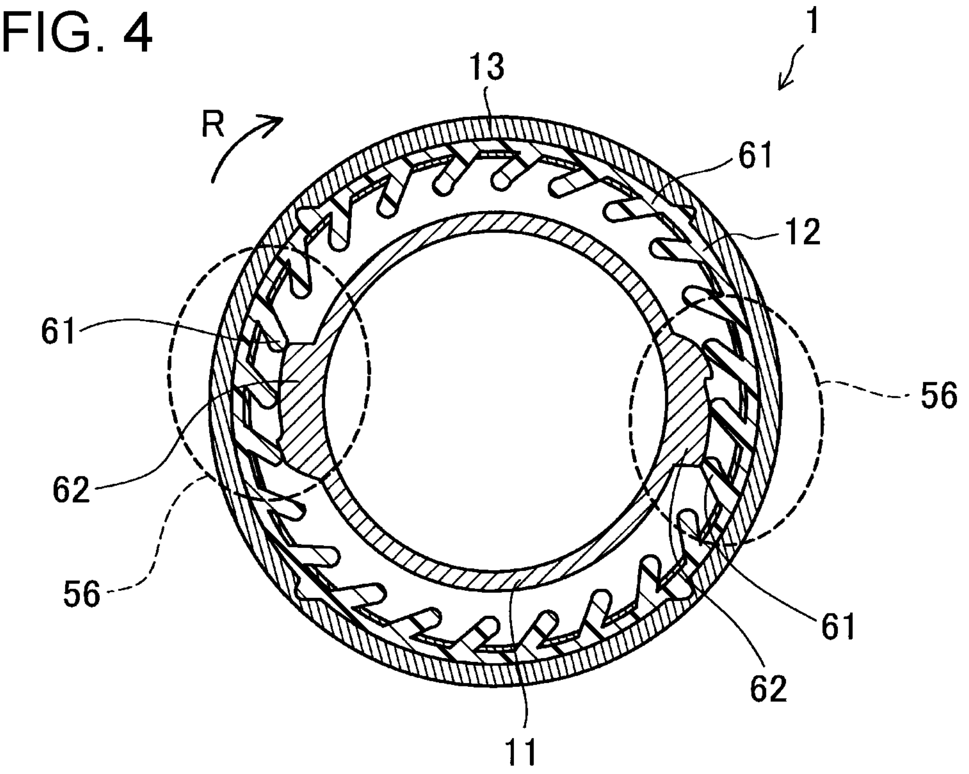
FIG. 4 is a cross-sectional view taken along line IV-IV of FIG. 3.
Figure 5:
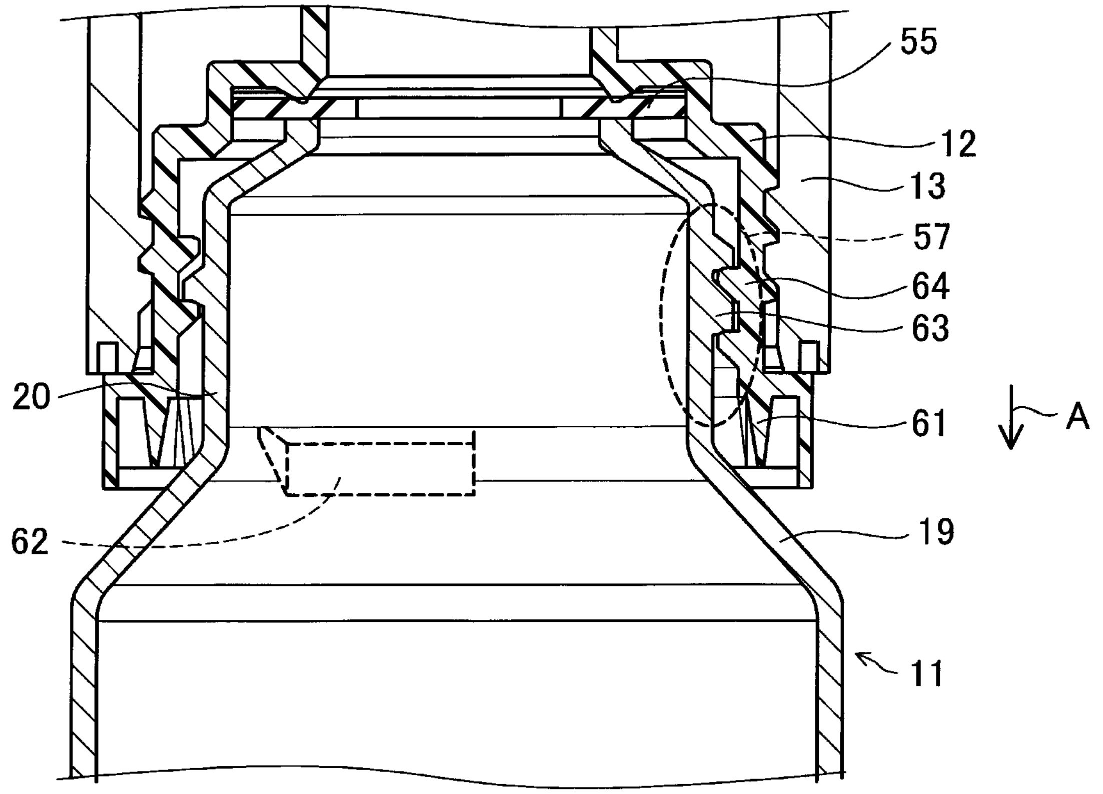
FIG. 5 is a cross-sectional view taken along line V-V of FIG. 3.

The pouring section 12 is coupled to an upper end of the liquid accommodation section 11. The pouring section 12 is formed of resin. The pouring section 12 is coupled to the liquid accommodation section 11 by units 56 and 57 (see FIGS. 4 and 5) that regulate decoupling of the pouring section 12 from the liquid accommodation section 11. FIG. 4 is a cross-sectional view taken along line IV-IV of FIG. 3. FIG. 5 is a cross-sectional view taken along line V-V of FIG. 3. As illustrated in FIGS. 3 and 5, the liquid accommodation section 11 includes, in order from a bottom side, a large-diameter section 18, a reducing diameter section 19 coupled to the large-diameter section 18 and gradually decreasing in diameter, and a small-diameter section 20 which is coupled to an upper end having a reduced diameter in the reducing diameter section 19 and has a constant diameter. The diameter of the small-diameter section 20 is smaller than a diameter of a lower end of the pouring section 12, and the pouring section 12 is coupled to the outside of the liquid accommodation section 11.

A packing 55 (see FIG. 5) is disposed at a coupling section between the pouring section 12 and the liquid accommodation section 11, and the packing 55 seals the coupling section. The packing 55 has flexibility, and for example, butyl rubber, fluoro rubber, hydrogenated nitrile rubber or the like are used for a forming material thereof.

Specifically, the units 56 and 57 that regulate the decoupling use ratchet engagement as a unit that regulates the movement in a circumferential direction, and use engagement by a screw as a unit that regulates the movement in a height direction. Details will be described below.

As illustrated in FIG. 4, a plurality of protrusions 61 protruding inward in a radial direction are formed on an inner circumference of the pouring section 12. The protrusions 61 protrude obliquely at an angle formed by a line coupling a base end to a front end and a tangent line at the base end, which is approximately 50°. Meanwhile, on an outer circumference of the small-diameter section 20 of the liquid accommodation section 11, a protrusion section 62 protruding outward in a radial direction is formed at a symmetrical position of 180°. A width of the protrusion section 62 in a circumferential direction is larger than a width of the protrusion 61 in the circumferential direction. The protrusion 61 formed in the pouring section 12 is in contact with the protrusion section 62 formed in the small-diameter section 20 in the circumferential direction, and accordingly, a counterclockwise rotation of the pouring section 12 with respect to the liquid accommodation section 11 is regulated. In other words, the pouring section 12 is allowed only a clockwise rotation indicated by an arrow R with respect to the liquid accommodation section 11. As described above, the unit 56 that regulates separation in the circumferential direction is a ratchet engagement by the protrusion 61 and the protrusion section 62.

As illustrated in FIG. 5, a male screw section 63 protruding outward in a radial direction is formed on an outer circumference of the small-diameter section 20 of the liquid accommodation section 11. Also, the protrusion section 62 of a ratchet mechanism is formed at a lower portion of the male screw section 63. In the example illustrated in FIG. 4, two protrusion sections 62 are provided to face each other in the radial direction. Although the protrusion sections 62 are formed on the outside of the liquid accommodation section 11, the protrusion sections 62 are illustrated by dotted lines in FIGS. 5 and 6 for the sake of convenience.

Meanwhile, a female screw section 64 protruding inward in the radial direction is formed on an inner circumference of the pouring section 12. Also, the protrusion 61 of a ratchet mechanism is formed at a lower portion of the female screw section 64.

When the pouring section 12 is assembled to the liquid accommodation section 11, the female screw section 64 of the pouring section 12 is engaged with the male screw section 63 of the liquid accommodation section 11 and screwed, and thereby, the pouring section 12 moves in a direction (see FIG. 5) of an arrow A. Further, the protrusion 61 and the protrusion section 62 are engaged with each other as screwing proceeds. As a result, the pouring section 12 is regulated from screwing loosening, and is regulated from moving in a height direction and a circumferential direction. Thereby, the pouring section 12 and the liquid accommodation section 11 are firmly coupled to each other. Accordingly, a user cannot easily remove the pouring section 12 from the liquid accommodation section 11. The coupling fixing between the pouring section 12 and the liquid accommodation section 11 is not limited to the screw engagement and the ratchet engagement and may be a combination of claw locking and a structure for regulating rotation other than ratchet, fixing with a film, a tape, an adhesive, and the like, welding, or the like.

According to the liquid replenishment container 1 of the first embodiment described above, the following effects can be obtained.

According to the first embodiment described above, the main section 14 of the liquid accommodation section 11 is formed of metal and occupies most of the liquid accommodation section 11. Accordingly, the main section 14 is suitable for reuse of the liquid replenishment container 1. Further, since the liquid accommodation section 11 includes the viewing section 15, the color of ink or the amount of the ink in the liquid accommodation section 11 can be viewed through the viewing section 15, and convenience of a user is improved. Further, since the liquid accommodation section 11 formed of metal is not required to be removed from the pouring section 12 to check the internal liquid, liquid leakage and scattering of liquid can be avoided.

According to the first embodiment, the viewing section 15 is provided on a side surface of the liquid accommodation section 11 in the height direction. Accordingly, the remaining amount of liquid in the entire height direction of the liquid accommodation section 11 is easily viewed, and convenience of a user is improved. Further, since the viewing section 15 is also provided on a bottom portion side lower than half the height, a state where the remaining amount of ink is reduced can be viewed, and a user can easily prepare a new replenishment container.

According to the first embodiment, information such as a color and a model number of ink, a QR code including the information, information indicating the remaining amount such as full or low, or a scale (hereinafter, referred to as "information on the liquid replenishment container 1") is displayed on the main section 14 formed of metal. Accordingly, since the information on the liquid replenishment container 1 is not required to be displayed on the viewing section 15 and the liquid accommodation section 11 is not required to be covered with a film on which the information is described, a state of liquid is easily viewed through the viewing section 15, and convenience is improved.

According to the first embodiment, the pouring section 12 is coupled to the liquid accommodation section 11 by the units 56 and 57 that regulate separation. Accordingly, ink is suppressed from being leaked due to unintentional separation of the pouring section 12 from the liquid accommodation section 11. Also, when recoupling the separated pouring section 12, leakage of ink due to a defect such as misalignment of the internal packing 55 or coupling failure can be suppressed.

B. Second Embodiment

Figure 6:
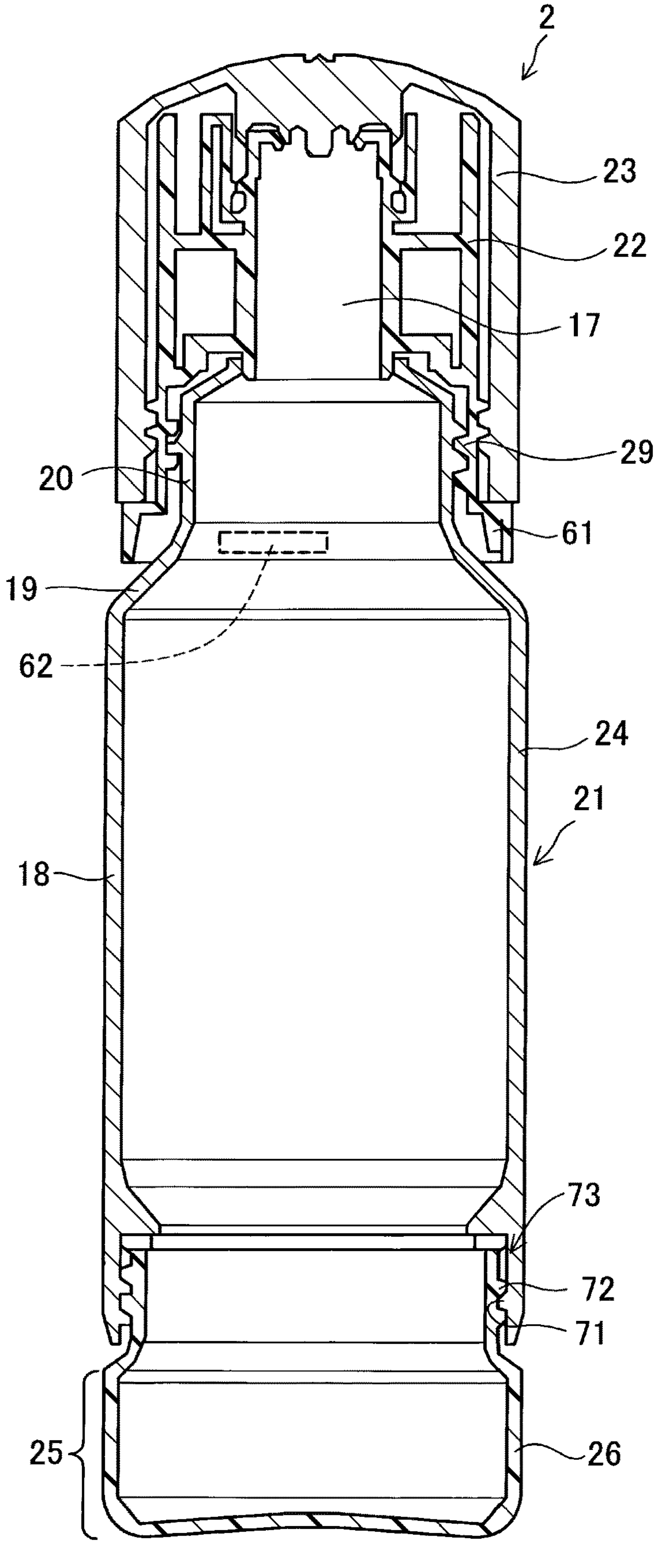
FIG. 6 is a cross-sectional view illustrating entirety of a liquid replenishment container according to a second embodiment.
Figure 7:
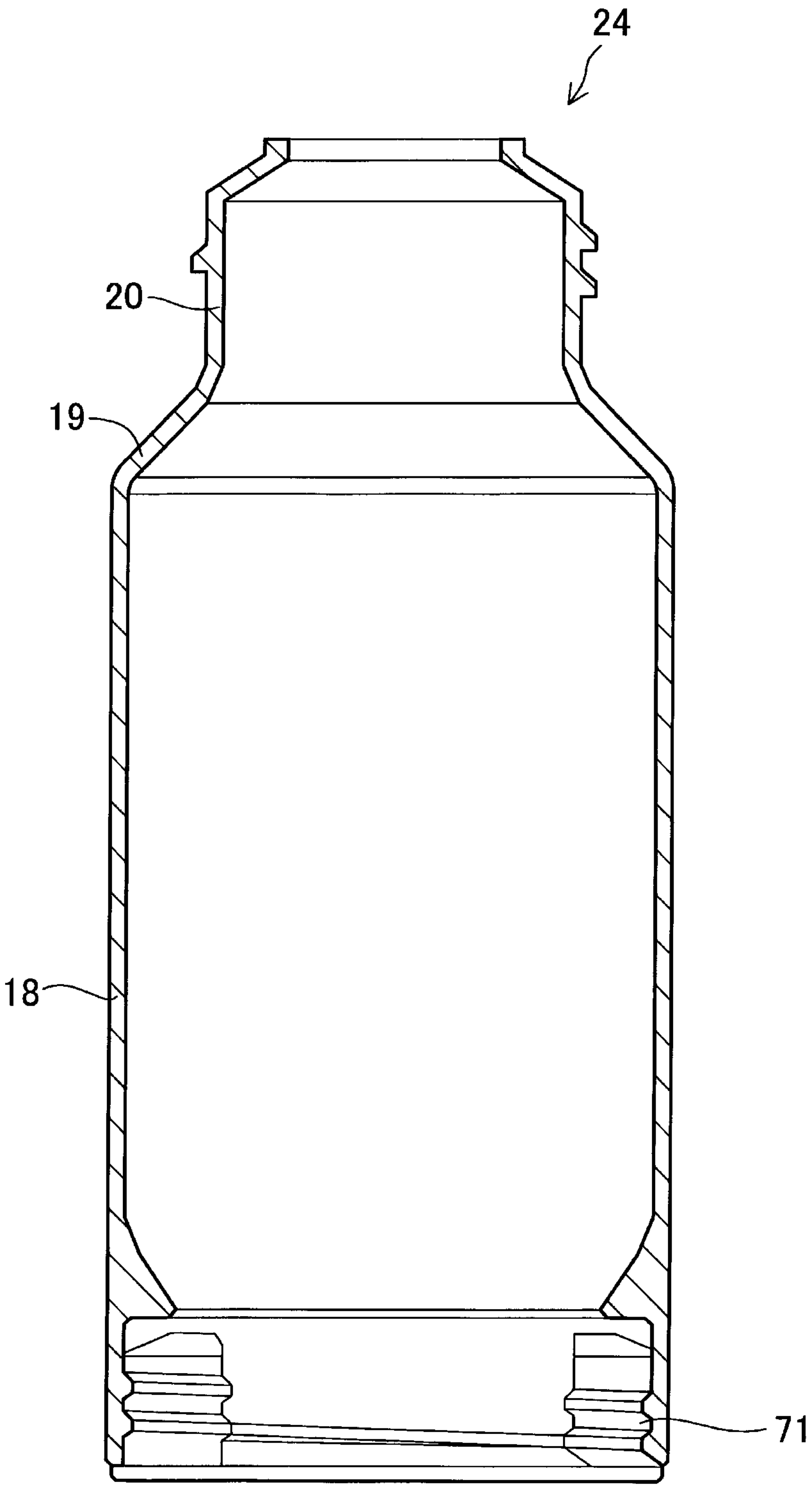
FIG. 7 is a cross-sectional view illustrating a main section.

Next, a liquid replenishment container 2 according to a second embodiment of the present disclosure will be described with reference to FIGS. 6 and 7. In a plurality of embodiments to be described below, the same reference numerals are given to the same configurations as in the first embodiment, and descriptions thereof will be omitted. FIG. 6 is a cross-sectional view illustrating entirety of the liquid replenishment container 2 according to the second embodiment. As illustrated in FIG. 6, the liquid replenishment container 2 of the second embodiment is the same as the liquid replenishment container 1 of the first embodiment in that a liquid accommodation section 21, a pouring section 22, and a cap section 23 are provided, but differs from the first embodiment in that a viewing section 25 is formed in a bottom cover section 26 which is a separate member from a main section 24. Also, coupling between the liquid accommodation section 21 and the pouring section 22 is the same as in the first embodiment, and is made by engagement of a screw 29 and ratchet engagement between a protrusion section 62 and a protrusion 61.

The liquid accommodation section 21 includes the main section 24 formed of metal and the bottom cover section 26 formed of resin. FIG. 7 is a cross-sectional view illustrating the main section 24. The pouring section 22 is coupled to an upper end side of the main section 24, and the bottom cover section 26 is coupled to a lower end side of the main section 24. The main section 24 occupies a length of approximately ¾ of the liquid accommodation section 21 in a height direction. The bottom cover section 26 occupies a length of approximately ¼ of the liquid accommodation section 21 in the height direction.

The bottom cover section 26 is detachably coupled to the main section 24 by engagement between a screw section 71 formed at a lower end of the main section 24 and a screw section 72 (see FIG. 6) formed at an upper end of the bottom cover section 26. During coupling, a part of the upper end of the bottom cover section 26 is accommodated in the main section 24. In the bottom cover section 26, a part which is not accommodated in the main section 24 is formed as a "viewing section 25". The bottom cover section 26 corresponds to a "separate member" from the main section 24.

A coupling part due to the screw engagement between the screw sections 71 and 72 is hereinafter referred to as a "screw engagement section 73". The screw engagement section 73 is formed inside a side wall defining the main section 24 formed of metal. Accordingly, the screw engagement section 73 cannot be viewed from the outside of the liquid replenishment container 2.

According to the second embodiment, the same effect as in the liquid replenishment container 1 of the first embodiment can be obtained. In addition, since the screw engagement section 73 is not visible from the outside, the bottom cover section 26 including the viewing section 25 can be suppressed from being erroneously removed. Also, since the main section 24 and the bottom cover section 26 are engaged with a screw, a structure that can be easily attached and detached during reuse can be provided. Also, since the bottom cover section 26 is separate from the main section 24, manufacturing is easier compared to a case of integration.

According to the second embodiment, the bottom cover section 26 is attachable to and detachable from the main section 24, and thus, the bottom cover section 26 can be replaced during reuse. Also, the viewing section 25 can be easily removed to clean the inside of the liquid accommodation section 21. Since a bottom portion side of the liquid accommodation section 21 and the pouring section 22 side can be opened, cleaning and drying can be performed in a short time. Further, the viewing section 25 can also be removed to inject a liquid into the liquid accommodation section 21 from a bottom side of the liquid accommodation section 21.

C. Third Embodiment

Figure 8:
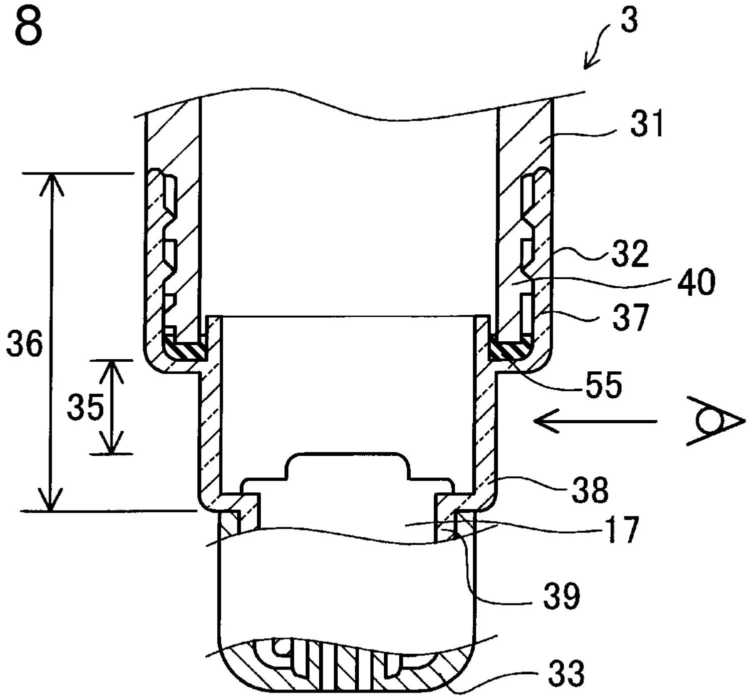
FIG. 8 is a cross-sectional view mainly illustrating a periphery of a cap section and a pouring section in a state where top and bottom of a liquid replenishment container according to a third embodiment is reversed.

Next, a liquid replenishment container 3 according to a third embodiment of the present disclosure will be described with reference to FIG. 8. FIG. 8 is a cross-sectional view mainly illustrating a periphery of a cap section 33 and a pouring section 32 in a state where top and bottom of the liquid replenishment container 3 according to the third embodiment is reversed. The liquid replenishment container 3 according to the third embodiment mainly differs from the liquid replenishment container 1 of the first embodiment in a configuration of the pouring section 32. The liquid replenishment container 3 includes a liquid accommodation section 31, the pouring section 32, and the cap section 33. As illustrated in FIG. 8, the pouring section 32 includes an uncovered section 36 that is not covered with the cap section 33. In the third embodiment, a viewing section 35 is disposed in the uncovered section 36. Details will be described below.

The pouring section 32 includes a large-diameter section 37 having a female screw structure formed inside, a medium-diameter section 38, and a small-diameter section 39 having a male screw structure formed outside coaxially in this order from the liquid accommodation section 31 side. Entirety of the pouring section 32 is formed of transparent resin. The large-diameter section 37, the medium-diameter section 38, and the small-diameter section 39 have a cylindrical shape, and diameters thereof decrease in this order.

The large-diameter section 37 of the pouring section 32 is screwed to a bottle screw section 40 formed on an outer circumference of the liquid accommodation section 31. By this screwing, the pouring section 32 is mounted on the liquid accommodation section 31. A packing 55 is disposed at a coupling section between the pouring section 32 and the liquid accommodation section 31. A female screw structure (not illustrated) is disposed inside the cap section 33, and is screwed to a male screw structure of the small-diameter section 39 of the pouring section 32.

An outlet port (not illustrated) is formed at a front end (lower end in FIG. 8) of the small-diameter section 39. A valve structure 17 is disposed inside the small-diameter section 39. FIG. 8 schematically illustrates the valve structure 17. A part of the valve structure 17 overlaps the medium-diameter section 38 in a height direction, and the valve structure 17 is substantially contained inside the small-diameter section 39. A portion of the uncovered section 36, which is located at the medium-diameter section 38 and does not overlap the valve structure 17 in the height direction, functions as a "viewing section 35". That is, the valve structure 17 is provided at a position offset from the viewing section 35 in the height direction. No members other than the valve structure 17 are provided inside the viewing section 35. Since the pouring section 32 is formed of transparent resin as described above, the inside of the medium-diameter section 38 can be viewed from the outside through the viewing section 35. Since the liquid accommodation section 31 formed of metal is accommodated inside the large-diameter section 37, the inside of the liquid accommodation section 31 cannot be viewed from the outside.

When it is desired to check the remaining amount of ink, and when the liquid replenishment container 3 is turned upside down, the remaining ink in the liquid accommodation section 31 moves to the pouring section 32 side, and thus, the remaining amount of ink can be checked by viewing the viewing section 35 from the side.

In the pouring section 32, a recess portion (not illustrated) that is present at a rotationally symmetric position of 180° is formed around an outlet port. The recess portion is configured to engage with a projection portion protruding inward from an inner circumferential wall of a socket provided in the ink tank 700 of the printer 100. That is, the above-described configuration is an uneven section for preventing erroneous injection, and by using a liquid replenishment container including a recess portion that engages with a projection portion having a different shape for each color of the ink tank 700, erroneous injection of injecting a liquid of the liquid replenishment container of a different color into the ink tank 700 can be prevented (for details, see JP-A-2022-18869). In addition, the uneven section for preventing erroneous injection is provided at a position offset from the viewing section 35 in a height direction.

According to the third embodiment, the same effect as in the liquid replenishment container 1 of the first embodiment can be obtained. In addition, a state of ink can be easily checked through the viewing section 35 provided in the uncovered section 36 that is not covered with the cap section 33. Also, since the valve structure 17 and other members are not disposed inside the viewing section 35, a state of ink is more easily viewed through the viewing section 35.

D. Fourth Embodiment

Figure 9:
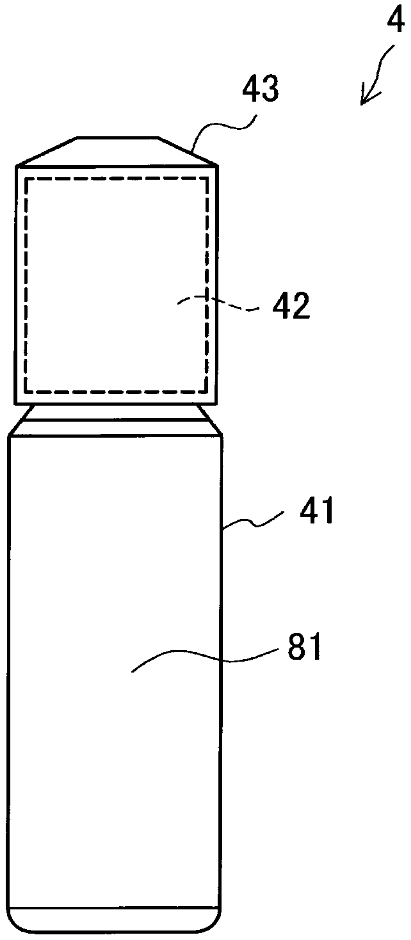
FIG. 9 is a front view illustrating an appearance of a liquid replenishment container according to a fourth embodiment.

Next, a liquid replenishment container 4 according to a fourth embodiment of the present disclosure will be described with reference to FIG. 9. FIG. 9 is a front view illustrating an appearance of the liquid replenishment container 4 according to the fourth embodiment. The liquid replenishment container according to the fourth embodiment includes a liquid accommodation section 41, a pouring section 42, and a cap section 43. The liquid accommodation section 41 is formed of transparent or translucent glass. On a surface of the liquid accommodation section 41, a transparent or translucent film member 81 is mounted along an outer circumference thereof by shrink packaging. An outer shape of the pouring section 42 and a wall forming a space for accommodating the valve structure 17 inside the pouring section 42 are formed of resin.

According to the fourth embodiment, entirety of the liquid accommodation section 41 is formed of glass, and thus, the liquid accommodation section 41 is suitable for reuse. Also, ink in the liquid accommodation section 41 is easily viewed. Further, even when ink is not left, there is a certain amount of weight as compared to the liquid accommodation section formed of resin and it is difficult to fall down in a state where the bottom of the liquid accommodation section 41 is installed, and thus, the remaining liquid is less likely to leak from the pouring section 42. Also, during recovery, alignment is easily made. Further, since the pouring section 42 is formed of resin, an increase in weight of the liquid accommodation section 41 formed of glass can be suppressed.

According to the fourth embodiment, a film member 81 is mounted on a surface of a liquid accommodation section, and thus, glass is protected by the film member 81, and crack, scratch, chipping, and the like of the liquid accommodation section 41 can be suppressed. Also, when a specification is provided in which information such as a model number and a color is described on the film member 81, during reuse, the liquid accommodation section 41 formed of glass is reused, and the film member 81 can also be peeled off and replaced with a film member on which other information is described.

E. Other Aspects

E1. In the first embodiment, engagement by a ratchet or a claw is used as the units 56 and 57 that regulate separation of a coupling between the liquid accommodation section 11 and the pouring section 12, but instead of this, the engagement may be made by press-fitting, an adhesive, a film, a tape, or the like. Although coupling between the liquid accommodation section 11 and the pouring section 12 is released and separation is not completely impossible, the liquid accommodation section 11 and the pouring section 12 cannot be easily separated, and it is preferable that the units 56 and 57 can prevent a user from erroneously separating the liquid accommodation section 11 and the pouring section 12.

E2. In the first embodiment, a QR code, which is an example of information on the liquid replenishment container 1, is displayed on a surface of the liquid accommodation section 11, but a color and a model number may be displayed by characters. Also, in the first embodiment described above, the QR code is directly printed on metal, but the information on the liquid replenishment container 1 may be displayed by mounting a printed film on the surface. In this configuration, the film needs to be transparent or translucent in at least a part that covers the viewing section 15. Also, information on the liquid replenishment containers 2 and 3 may be displayed on the liquid replenishment containers 2 and 3 of the second and third embodiments.

E3. In each embodiment described above, a screw engagement structure of each coupling part may be adjusted such that a direction in which the cap sections 13, 23, 33, and 43 are tightened is opposite to a direction in which the pouring sections 12, 22, 32, and 42 are tightened with respect to the liquid accommodation sections 11, 21, 31, and 41. By doing so, when a user loosens a cap section, screw engagement of a pouring section is loosened at the same time, and the pouring sections 12, 22, 32, and 42 can be prevented from being inadvertently removed from the liquid accommodation sections 11, 21, 31, and 41. Such a structure may be adopted as a "unit that regulates separation".

E4. In the first embodiment, the viewing section 15 is continuously formed from a substantially upper end of a part of the liquid accommodation section 11 that is not covered with the cap section 13 to a bottom surface in a height direction of a side surface of the liquid accommodation section 11, but may not be continuously formed. For example, the viewing section 15 may be provided only on a bottom surface side of the half of the liquid accommodation section 11 in the height direction or may be provided in a form in which an upper half and a lower half in the height direction are separated. Also, a plurality of viewing sections may be configured to be intermittently arranged in a height direction in a dashed line shape.

E5. In the second embodiment, the bottom cover section 26 including the viewing section 25 formed therein and the main section 24 are coupled by screw engagement, but the coupling may be made by claw locking or the like, or the units 56 and 57 that regulate separation.

E6. In the third embodiment described above, although the valve structure 17 is provided at a position offset from the viewing section 35 in a height direction, the viewing section 35 and the valve structure 17 may overlap in the height direction. A state of ink inside the liquid accommodation section 31 may be checkable through the viewing section 35.

E7. In the first embodiment, the units 56 and 57 that regulate separation may not be provided.

E8. In the fourth embodiment, the film member 81 may not be provided.

The present disclosure is not limited to the embodiments described above, and can be realized in various configurations within the scope not departing from the concept of the present disclosure. For example, technical features in the embodiments corresponding to technical features in each aspect described in a column of an outline of the disclosure can be appropriately replaced or combined to partially or entirely solve the above-described problems, or to partially or entirely obtain the above-described advantageous effects. Also, when the technical features are not described in the present specification as essential elements, the technical features can be appropriately removed.

1. According to an aspect of the present disclosure, a liquid replenishment container is provided. The liquid replenishment container is a liquid replenishment container for replenishing a liquid jet apparatus with a liquid, and includes a liquid accommodation section configured to accommodate the liquid, a pouring section coupled to the liquid accommodation section and having an outlet port for pouring the liquid, and a cap section mounted on the pouring section and covering the outlet port, in which the liquid accommodation section includes a main section formed of metal, and at least one of the liquid accommodation section and the pouring section includes a viewing section formed of a transparent or translucent member.

According to this aspect, the main section of the liquid accommodation section is formed of metal, and thus, the main section is suitable for reuse. Also, at least one of the liquid accommodation section and the pouring section includes the viewing section formed of a transparent or translucent member, and thus, a color of a liquid or the amount of a liquid in the liquid accommodation section can be viewed through the viewing section and convenience of a user is improved. Since the liquid accommodation section formed of metal is not required to be removed from the pouring section to check an internal liquid, liquid leakage and scattering of the liquid can be avoided.

2. In the liquid replenishment container according to the above-described aspect, the viewing section may be disposed in a height direction of the liquid accommodation section. According to this aspect, the remaining amount of the liquid in the entire height direction of the liquid accommodation section can be easily viewed, and convenience of a user is improved.

3. In the liquid replenishment container according to the above-described aspect, the viewing section may be disposed on a bottom portion side less than half a height of the liquid accommodation section. According to this aspect, a user can view a state where the residual amount of a liquid is reduced, and thus, the user can easily prepare a new replenishment container.

4. In the liquid replenishment container according to the above-described aspect, the viewing section may be formed in a separate member from the main section, and the separate member may be coupled to the main section. According to this aspect, since the viewing section is configured as a separate member from the main section, manufacturing is relatively easy compared to a case of integration. Also, since the viewing section is formed in the separate member from the main section, when the liquid replenishment container is reused, the viewing section and the main section can be removed, each section can be easily cleaned, and cleaning and drying can be performed in a short time. Further, by removing the viewing section, a liquid can also be injected into the liquid accommodation section.

5. In the liquid replenishment container according to the above-described aspect, coupling between the viewing section and the main section may be performed by engagement between an engagement section of the main section and an engagement section of the separate member, and the engagement section of the main section may be formed inside a side wall defining the main section. According to this aspect, since the engagement section of the main section formed of metal is not visible from the outside, and thus, the viewing section can be configured to easily suppress erroneous removal.

6. In the liquid replenishment container according to the above aspect, the pouring section may include an uncovered section that is not covered with the cap section, and the viewing section may be disposed in the uncovered section. According to this aspect, the viewing section is not covered with the cap section, and thus, a state of a liquid can be easily viewed through the viewing section.

7. The liquid replenishment container according to the above aspect may further include a valve structure disposed in the pouring section, and the valve structure may be disposed at a position offset from the viewing section in a height direction. According to this aspect, the valve structure is not disposed inside the viewing section, and thus, a state of a liquid can be easily viewed through the viewing section.

8. In the liquid replenishment container according to the above aspect, information on the liquid replenishment container may be displayed in the main section. According to this aspect, necessary information such as a model number, a color, and a QR code is displayed on the main section formed of metal, and thus, the information is not required to be displayed on the viewing section, or the viewing section is not required to be covered with a film on which such information is described. Therefore, a state of a liquid can be easily viewed, and convenience is improved.

9. According to an aspect of the present disclosure, a liquid replenishment container is provided. A liquid replenishment container includes a liquid accommodation section accommodating a liquid, a pouring section coupled to the liquid accommodation section and having an outlet port for pouring a liquid, and a cap section mounted on the pouring section and covering the outlet port, in which the liquid accommodation section may be formed of transparent or translucent glass.

According to this aspect, the liquid accommodation section is formed of glass, and thus, the liquid accommodation section is suitable for reuse. Also, since the liquid accommodation section is transparent or translucent, a liquid in the liquid accommodation section is easily viewed. Further, even when the liquid is not left, there is a certain amount of weight compared to the liquid accommodation section formed of resin, and thus, it is difficult to fall down in a state where the bottom of the liquid accommodation section is installed. Accordingly, a residual liquid is less likely to leak from the pouring section. Also, during recovery, alignment is easily made.

10. In the above aspect, a wall of the pouring section may be formed of resin. According to the above-described aspect, an increase in weight of the liquid accommodation section formed of glass can be suppressed because a wall of the pouring section is formed of resin.

11. In the above aspect, a transparent or translucent film member may be mounted on a surface of the liquid accommodation section. According to this aspect, a film member is mounted on a surface of a liquid accommodation section, and thus, glass is protected by the film member, and crack, scratch, chipping, and the like of the liquid accommodation section can be suppressed. Also, when a specification is provided in which information such as a model number and a color is described on the film member, during reuse, the liquid accommodation section formed of glass can be reused, and the film member can also be peeled off and replaced with a film member on which other information is described.

12. In the above aspect, the pouring section may be coupled to the liquid accommodation section by a unit that regulates separation. According to the above-described aspect, leakage of a liquid due to unintentional removal of the pouring section from the liquid accommodation section is suppressed. Also, when recoupling the separated pouring section, leakage of liquid due to a defect such as misalignment of an internal sealing member or coupling failure is suppressed.

Also, the present disclosure is not limited to an ink jet method, and can also be applied to a liquid replenishment container that replenishes a liquid to any liquid jet apparatus for ejecting a liquid other than the ink.

What is claimed is:

1. A liquid replenishment container for replenishing a liquid jet apparatus with a liquid, the liquid replenishment container comprising:

a liquid accommodation section configured to accommodate the liquid;

a pouring section coupled to the liquid accommodation section and having an outlet port for pouring the liquid; and a cap section mounted on the pouring section and covering the outlet port, wherein the liquid accommodation section includes a main section formed of metal and a viewing section formed of a transparent or translucent member;

the viewing section extends along a height direction of the liquid accommodation section; and the viewing section does not cover the main section formed of metal.

2. The liquid replenishment container according to claim 1, wherein information on the liquid replenishment container is displayed on the main section.

3. The liquid replenishment container according to claim 1, wherein the pouring section is coupled to the liquid accommodation section by a unit that regulates decoupling of the pouring section from the liquid accommodation section.

4. The liquid replenishment container according to claim 1, wherein the main section and the viewing section are bonded to each other.

5. The liquid replenishment container according to claim 4, wherein the viewing section is fitted to an opening provided in the main section through a sealing member.

6. A liquid replenishment container for replenishing a liquid jet apparatus with a liquid, the liquid replenishment container comprising:

a liquid accommodation section configured to accommodate the liquid;

a pouring section coupled to the liquid accommodation section and having an outlet port for pouring the liquid; and a cap section mounted on the pouring section and covering the outlet port, wherein the liquid accommodation section includes a main section formed of metal and a viewing section formed of a transparent or translucent member;

the viewing section is disposed on a bottom portion side of less than half a height of the liquid accommodation section; and the viewing section is formed of a separate member from the main section, and the separate member is coupled to the main section by engagement between an engagement section of the main section and an engagement section of the separate member, and the engagement section of the main section is formed inside a side wall defining the main section.

7. A liquid replenishment container for replenishing a liquid jet apparatus with a liquid, the liquid replenishment container comprising:

a liquid accommodation section configured to accommodate the liquid;

a pouring section coupled to the liquid accommodation section and having an outlet port for pouring the liquid; and a cap section mounted on the pouring section and covering the outlet port, wherein the liquid accommodation section includes a main section formed of metal;

the pouring section includes a viewing section formed of a transparent or translucent member; and the pouring section includes an uncovered section that is not covered by the cap section, and the viewing section is disposed in the uncovered section.

8. The liquid replenishment container according to claim 7, further comprising a valve structure disposed in the pouring section, wherein the valve structure is disposed at a position offset from the viewing section in a height direction.

* * * * *